United States Patent [19]
Martin

[11] 3,770,973
[45] Nov. 6, 1973

[54] APPARATUS FOR REMOTELY MEASURING THE TEMPERATURE AND EMISSIVITY OF A RADIANT OBJECT INDEPENDENT OF THE OBJECT'S RADIANT SURFACE PROPERTY

[75] Inventor: William Edward Martin, Hightstown, N.J.

[73] Assignee: RCA Corporation, New York, N.Y.

[22] Filed: Nov. 3, 1972

[21] Appl. No.: 303,415

[52] U.S. Cl.................. 250/340, 250/347, 250/349
[51] Int. Cl............................................. G01t 1/16
[58] Field of Search....................... 250/83.3 H, 340, 250/347, 349; 73/355 EM

[56] References Cited
UNITED STATES PATENTS
3,539,807  11/1970  Bickel...................... 73/355 EM X Primary Examiner—James W. Lawrence
Assistant Examiner—Davis L. Willis
Attorney—Edward J. Norton and Joseph D. Lazar

[57] ABSTRACT

An apparatus comprising first and second thermal sensors operating at first and second temperatures and generating electrical signals in response to thermal radiation from a radiant body and from an external source irradiating the radiant body is used to remotely measure the temperature and emissivity of the radiant body independent of its radiant surface property.

6 Claims, 4 Drawing Figures 3,770,973

APPARATUS FOR REMOTELY MEASURING THE TEMPERATURE AND EMISSIVITY OF A RADIANT OBJECT INDEPENDENT OF THE OBJECT'S RADIANT SURFACE PROPERTY

DESCRIPTION OF THE PRIOR ART

Certain disciplines require an apparatus that is capable of remotely mapping or sensing the true temperature of a radiant body or target body. In the prior art, a substitution method is one technique used for remotely determining the apparent temperature of a target body. An optical system is used to scan or view the target body and to focus the collected radiation onto a thermal sensor. The thermal sensor converts the collected radiation into an electrical signal proportional to the apparent unknown temperature of the target body. A reference black body at a known temperature is substituted for the target body. The thermal radiation from the black body is likewise converted by the thermal sensor into an electrical signal proportional to the known black body temperature. The apparent unknown temperature of the target body is equal to the known temperature of the reference black body when their respective temperature dependent sensor generated electrical signals are equal. The temperature of the reference black body is varied until a temperature is determined at which the sensor generated electric signal is equal to the sensor generated electric signal responsive to the apparent unknown temperature of the target body.

The apparent unknown temperature of the target body can also be determined analytically by knowing the temperature of the substituted black body and the ratio of the electrical signals proportional to the temperatures of the target body and substituted black body. The substitution technique is adequate when the radiative surface property of the target body is either black body in character or black body characteristics are assumed. However, if the target body does not exhibit black body radiative properties appreciable errors in true temperature measurement result.

SUMMARY OF THE INVENTION

The temperature and emissivity of a radiant body irradiated by an external source is measured by an apparatus using first and second sensors responsive to sensor detected radiation. The measurements are made independent of the radiant surface property of the radiant body. The first sensor operates at a first temperature and generates an electrical signal proportional to the first sensor detected radiation. The second sensor operates at a second temperature and generates an electrical signal proportional to the second sensor detected radiation. Radiation from the external source and from the radiant body is selectively directed to the first and second sensors. The first and second sensors include means for stimulating the generation of a reference electrical signal.

DESCRIPTION OF THE PREFERRED EMBODIMENT

The net radiant energy exchange between two bodies at the same temperature and undisturbed by external sources of radiation is zero irrespective of their radiant surface properties. Assume that one of the bodies is a thermal sensor capable of converting the detected net radiant exchange between the sensor and the second body into a proportional electrical signal. The magnitude of the sensor generated electrical signal is zero when the temperature of the thermal sensor is equal to the temperature of the second body. This principle would theoretically allow the temperature of a remote body to be determined by varying the temperature of a thermal sensor until the magnitude of the sensor generated electrical signal is equal to zero. However, there are some practical limitations to this technique. One limitation is that the sensor may be in radiant equilibrium with other surrounding thermal bodies including the second body. Under these circumstances, it is difficult to distinguish the net radiant exchange between only the second body and the sensor. Also, it is difficult to rapidly change the sensor temperature to the temperature at which the magnitude of the sensor generated electrical signal is equal to zero. These limitations are minimized by use of a three body system which comprises only the target body and two remote sensors designed to have the same responsivity and to operate at different fixed temperatures.

Figure 1:
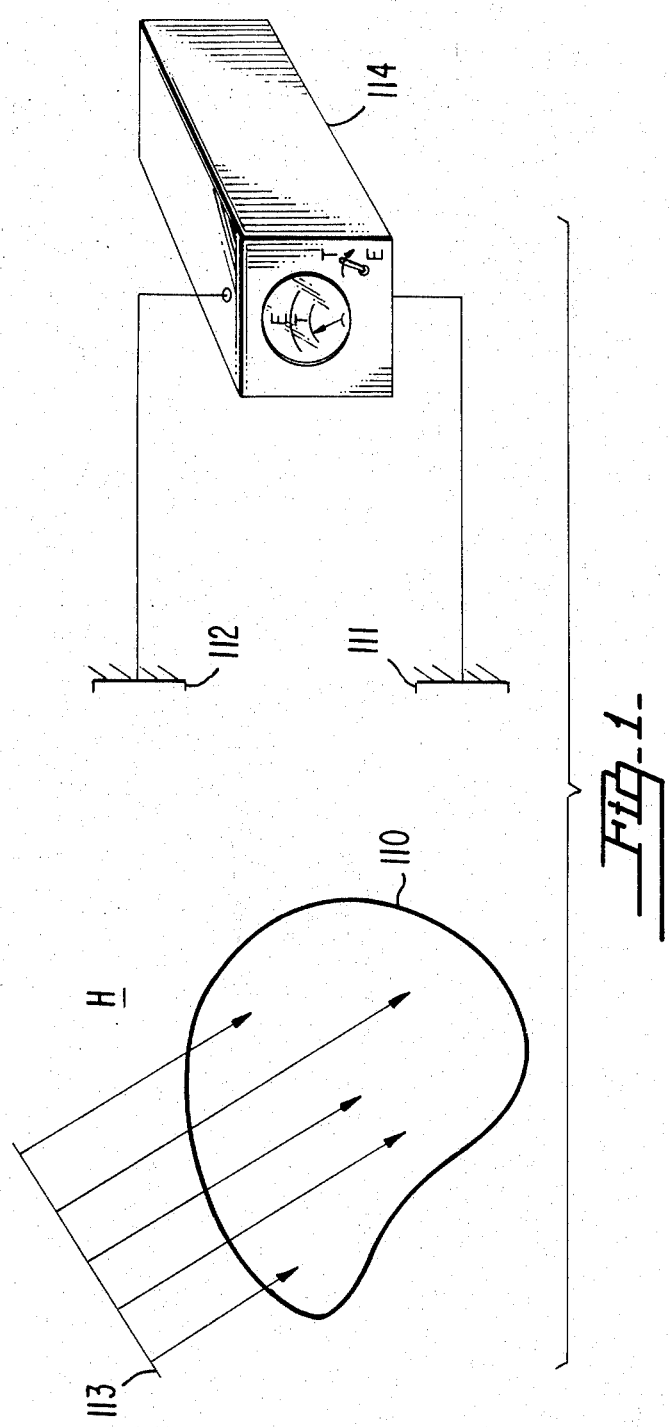
FIG. 1 is a schematic of a three body system illustrating the concept of the disclosed invention.

Referring to FIG. 1, there is shown a three body system illustrating the principle by which the true temperature of a body can be remotely measured independent of its radiant surface property. It is assumed that target body 110 is being irradiated by an external source of thermal radiation 113, which source is radiating uniformly over a solid angle of $2\pi$ steradians within which target body 110 is situated. For example, assume it is desirable to measure the true temperature of a portion of the human anatomy during surgery. The target body 110 would be the desired portion of the human anatomy and the external source of radiation 113 would be the surrounding environment of the operating room. In the three body system, the irradiation of target body 110 by external source 113 is represented by the irradiation factor H. Target body 110 is in radiant equilibrium with a first sensor body 111 operating at temperature $T_2$ and a second sensor body 112 operating at temperature $T_3$. In other words, the net radiant energy flow between target body 110 and either the first or second sensors 111 and 112 is in a steady state condition. The first and second sensor bodies 111 and 112 are designed to convert sensor detected net thermal radiant energy into electrical energy in the form of a voltage signal. Sensor generated voltage signals are coupled to meter 114.

Conditions are provided by the system for stimulating each sensor 111 and 112 into generating a reference voltage signal. The sensor reference voltage signals are used to avoid ambiguous sensor generated voltage signals in response to net thermal radiant energy from either target body 110 or the external source of radiation 113. The sensor reference voltage signals are coupled to meter 114 where they are stored in a memory bank. The magnitude and polarity of the voltage signals generated by sensors 111 and 112 in response to thermal radiant energy from either the external source 113 or target body 110 are coupled to meter 114. These voltage signals are referred to as source and target body voltage signals. Meter 114 then records and stores the magnitude and polarity of the source and target body voltage signals relative to the sensor reference signal. Meter 114 may be designed so that a negative voltage signal indicates that the temperature of the source of radiant thermal energy (target body 110 or source 113) being scanned or viewed by a sensor is greater than the sensor operating temperature. Likewise, a positive voltage signal indicates that the temperature of the object (target body 110 or source 113) being scanned or viewed by a sensor is less than the sensor operating temperature. Sensors 111 and 112 are designed to approach unity emissivity. Also, the responsivity of first sensor 111 is equal to the responsivity of second sensor 112.

First sensor 111 generates an electrical signal that is recorded by meter 114 as relative voltage signal $V_2$ when it directly scans or views target body 110 and an electrical signal that is recorded by meter 114 as relative voltage signal $V'_2$ when it directly scans or views the external source 113 of the irradiation factor H. Likewise, second sensor 112 generates an electrical signal that is recorded by meter 114 as relative voltage signal $V_3$ when it scans or views target body 110 and an electrical signal that is recorded by meter 114 as relative voltage signal $V_3'$ when it directly scans or views the external source 113 of the irradiation factor H. Meter 114 is programed to analytically determine the temperature, $T_1$, of the target body from the equation:

$$\sigma T_1^4 = \sigma T_2^4 \left[ V'_3 - (T_3/T_2)^4 V'_2 / V'_3 - V'_2) + (V_3 - V'_3) - (I_3/T_2)^4 (V_2 - V'_2)/V_3 - V_2) \right] \quad (1)$$

where $T_2$ is the temperature of first sensor 111, $T_3$ is the temperature of second sensor 112, $V_2$ is the relative electrical signal generated by first sensor 111 when it scans or views target body 110, $V'_2$ is the relative electrical signal generated by first sensor 111 when it scans or views the external source 113 of the irradiation factor H, $V_3$ is the relative electrical signal generated by second sensor 112 when it scans or views target body 110, $V'_3$ is the relative electrical signal generated by the second sensor 112 when it scans or views the external source 113 of the irradiation factor H and $\sigma$ is the Stefan-Boltzman constant.

Meter 114 is programed to analytically determine the emissivity, $E_1$, of target body 110 from the equation:

$$E_1 = V_2 - V_3/V'_2 - V'_3$$

where $V_2$ is the relative electrical signal generated by first sensor 111 when it scans or views target body 110, $V_3$ is the relative electrical signal generated by second sensor 112 when it scans or views target body 110, $V'_2$ is the relative electrical signal generated by first sensor 111 when it scans or views the external source 113 of the irradiation factor H, and $V'_3$ is the relative electrical signal generated by second sensor 112 when it scans or views the external source 113 of the irradiation factor H.

Figure 2:
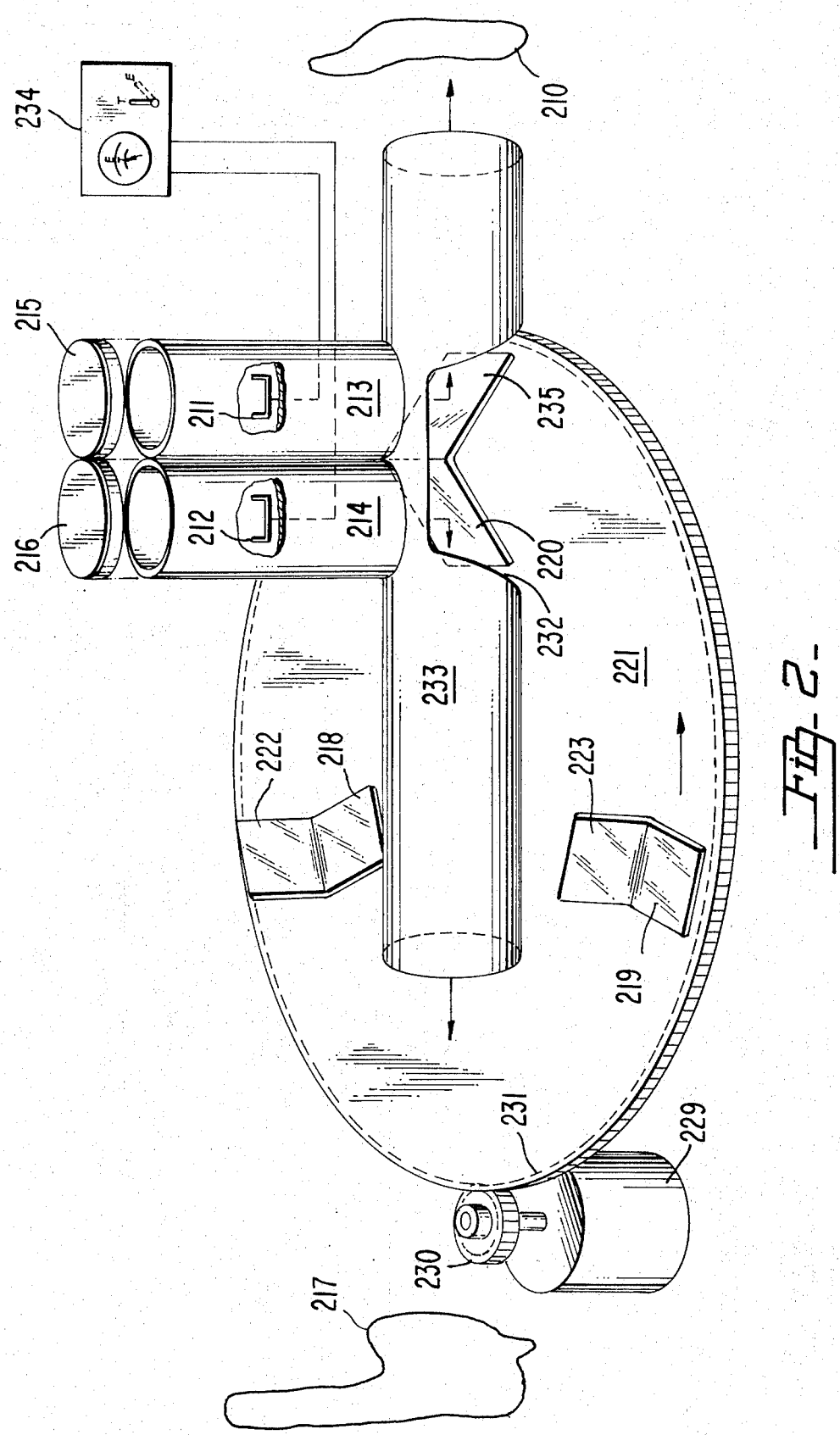
FIG. 2 is a drawing of a first measuring position of an improved temperature measuring radiometer.

Referring to FIG. 2, there is shown one embodiment of a true temperature measuring radiometer using the three body system illustrated in FIG. 1. The radiometer employs a first sensor 211 operating at temperature $T_2$ and a second sensor 212 operating at temperature $T_3$. Sensors 211 and 212 are necessary for determining the unknown temperature, $T_1$, of target body 210 independent of the target body's radiative surface property. Target body 210 is being irradiated by an external source 217 similar to source 113 in FIG. 1. The radiometer utilizes first, second and third optical channels or circular tubes 213, 214 and 233. The first and second optical channels 213 and 214 are terminated at one end by a catoptric lens 215 and 216, respectively. Each of catoptric lenses 215 and 216 has a thermal reflective coating on its exterior surface. The open ends of the first and second optical channels 213 and 214 are orthogonally joined to the wall of the third optical channel 233 around a through hole or aperture. A second hole or aperture 232 is cut through the wall of the third optical channel 233 opposite the open ends of the first and second optical channels 213 and 214. The second hole or aperture 232 is designed to permit the passage of reflective surface sections into and through the third optical channel 233.

A structure, not shown, supports optical channels 213, 214 and 233 above a motor driven rotatable disc 221. The motor 229 rotates the disc 221 until a predetermined pair of reflective surface sections are positioned inside the third optical channel 233. The angular position of the predetermined pair of reflective surface sections is designed to reflect a radiant energy exchange between sensors 211 and 212 and either target body 210 or source 217. The first and second thermal sensors 211 and 212 are internally located within optical channels 213 and 214 in the effective focal plane of the respective catoptric lenses 215 and 216. Radiation thermocouples or thermistor bolometers are examples of thermal conductive sensors capable of converting detected thermal radiant energy into electrical energy. Substantially all the radiant thermal energy exchange in optical channel 213 is ultimately focused on thermal sensor 211 and substantially all the thermal energy exchange in optical channel 214 is ultimately focused on thermal sensor 212.

The radiometer is designed to provide a condition whereby sensors 211 and 212 are each stimulated into generating a reference voltage signal. The sensor reference voltage signal is coupled to an apparatus 234, similar to a computer or meter 114 in FIG. 1. Apparatus 234 records and stores the reference voltage signal generated by each sensor 211 and 212. Each sensor 211 and 212 generates a voltage signal proportional to net radiant thermal energy from either target body 210 or source 217. The sensor generated electrical signals are coupled to apparatus 234. The polarity and magnitude of the sensor generated voltage signals are determined by apparatus 234 relative to the sensor reference voltage signals. The apparatus 234 is programed to compute and display the true temperature, $T_1$, and emissivity, $E_1$, of target body 210 according to equations (1) and (2).

The radiometer is illustrated in FIG. 2 as being orientated to be between radiation source 217 and target body 210 with one end of the third optical channel 233 aligned for viewing or scanning radiation source 217 and the other third optical channel end aligned for viewing target body 210. In addition, FIG. 2 illustrates the orientation of reflective surface sections 220, 235 on disc 221 to affect a first radiometer measurement.

The motor 229 having a gear 230 engaged with teeth 231 on the edge of the rotatable disc 221 rotates the disc 221 until a pair of isothermal reflective surface elements 220 and 235 pass through aperture 232 and are positioned inside the third optical channel 233. The reflective surface elements 220, 235 are mounted on the surface of the disc 221 at a predetermined angle with respect to the longitudinal axis of the first and second optical channels 213 and 214. The mounting angle of reflective surface element 220 permits radiation from radiation source 217 to be detected by only thermal sensor 212. The mounting angle of reflective surface element 235 permits radiation from target body 210 to be detected by only thermal sensor 211. For example, if the disc 221 surface is orthogonal to the longitudinal axis of the first and second optical channels 213 and 214, reflective surface element 220 is mounted at an angle of 45° with respect to the disc surface and reflective surface element 235 is mounted at an angle of 135° with respect to the disc surface.

Radiant thermal energy from both the source 217 and target body 210 enter the third optical channel 233 and is reflected by angularly mounted reflective surface sections 220 and 235 toward thermal sensors 211 and 212. First thermal sensor 211 converts the detected radiant energy exchange between target body 210 and sensor 211 into a proportional electrical signal. Thermal sensor 212 converts the detected radiant energy exchange between source 217 and sensor 212 into a proportional electrical signal. The sensor generated electrical signals proportional to the radiant exchange between sensors 211 and 212 and target body 210 and source 217 are coupled to apparatus 234. They are recorded and stored by apparatus 234 as relative voltage signals $V_2$ and $V'_3$.

An erroneous determination of target temperature, $T_1$, is avoided if the magnitude and polarity of the sensor generated electrical signals are determined relative to an established reference signal level. A reference signal level for a sensor is established by designing the radiometer to provide an operating condition in which the radiant energy leaving a sensor equals the radiant energy being received by the same sensor. Under these ideal conditions, the net radiant exchange detected by the sensor is zero and therefore, the magnitude of the sensor generated electrical signals or reference signal is zero. One method of establishing the reference signal level for a sensor is to permit each sensor 211 and 212 to view itself in a reflective surface section 218 and 219. Thus, all radiant energy emitted by sensors 211 and 212 is reflected back to sensors 211 and 212 and the net radiant exchange detected by sensors 211 and 212 is zero. This is illustrated later in FIGS. 3 and 4.

The polarity of the sensor generated electrical signals relative to the reference signal level indicate the direction of thermal energy flow. For example, sensors 211 and 212 may be instrumented to determine that a negative sensor generated electrical signal is an indication that thermal radiant energy is leaving the sensor. This determination would indicate that the sensor operating temperature is greater than the temperature of the thermal source (target body 210 or source 217) being scanned.

Figure 3:
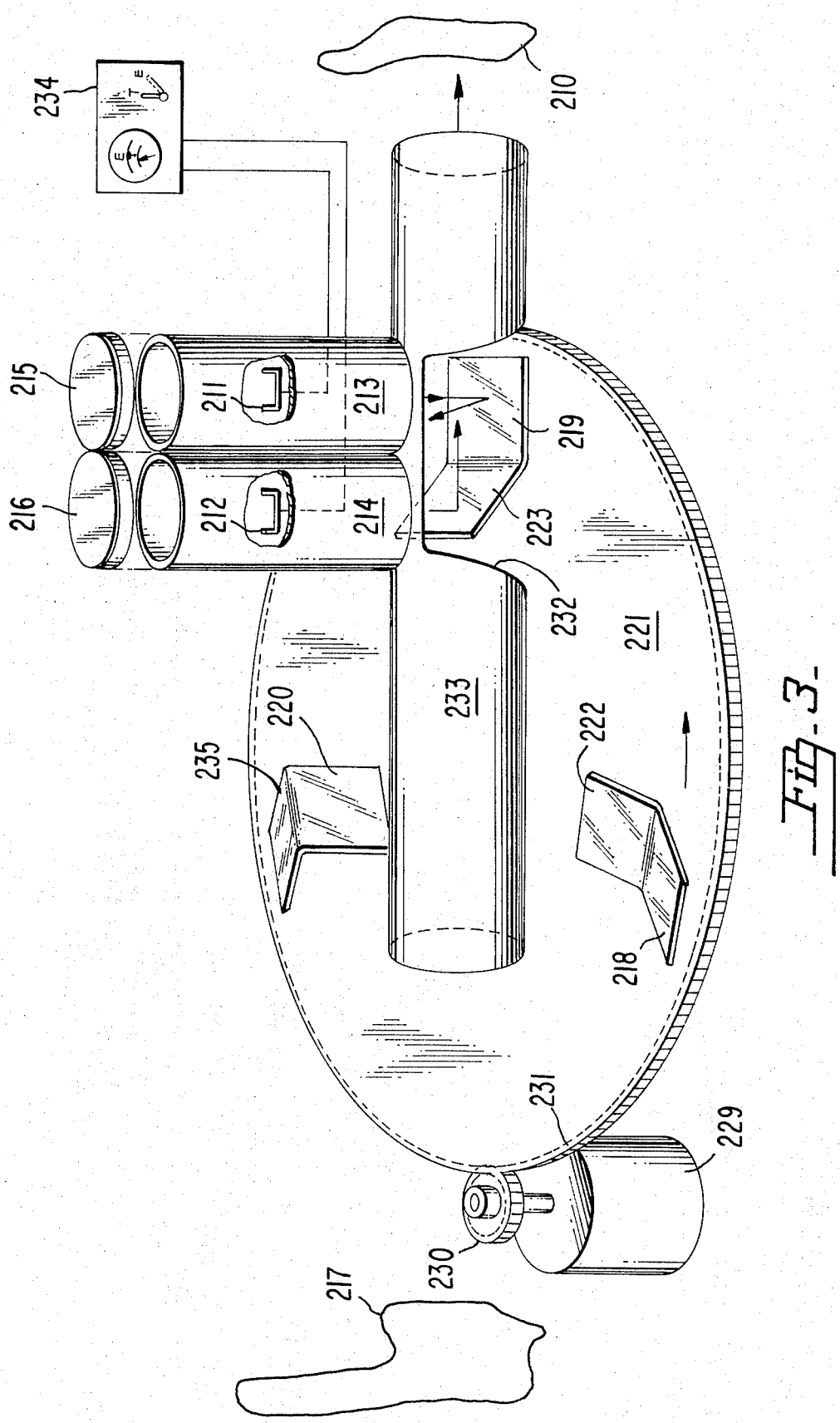
FIG. 3 is a drawing of a second measuring position of an improved temperature measuring radiometer.

Referring to FIG. 3, there is shown an illustration of a second radiometer measuring position. Disc 221 is rotated by motor 229 until the pair of isothermal reflective surface sections 219 and 223 pass through aperture 232 and are positioned inside third optical channel 233. Reflective surface section 219 is mounted on the surface of disc 221 orthogonal to the longitudinal axis of first optical channel 213. Reflective surface section 219 is positioned to provide first sensor 211 with a self-view. The radiant energy emitted by first sensor 211 is reflected back to first sensor 211 by reflective surface section 219. The resulting first sensor generated electrical signal, if any, is the first sensor reference signal level. The first sensor reference signal is coupled to apparatus 234 where it is recorded and stored.

Reflecting surface section 223 is mounted on the surface of disc 221 at a predetermined angle. The mounting angle of reflective surface section 223 permits thermal radiation from target body 210 to be detected by only second thermal sensor 212. As an example, reflective surface section 223 is mounted at an angle of 135° with respect to the surface of disc 221. The net thermal radiant energy exchange between target body 210 and second sensor 212 is converted by sensor 212 into an electrical signal which is coupled to apparatus 234. The relative magnitude and polarity of this second sensor generated electrical signal is recorded and stored by apparatus 234 as relative voltage signal $V_3$. The relative voltage signal $V_3$ is used by apparatus 234 in the computation of the true target body temperature, $T_1$, and emissivity, $E_1$, according to equations (1) and (2).

Figure 4:
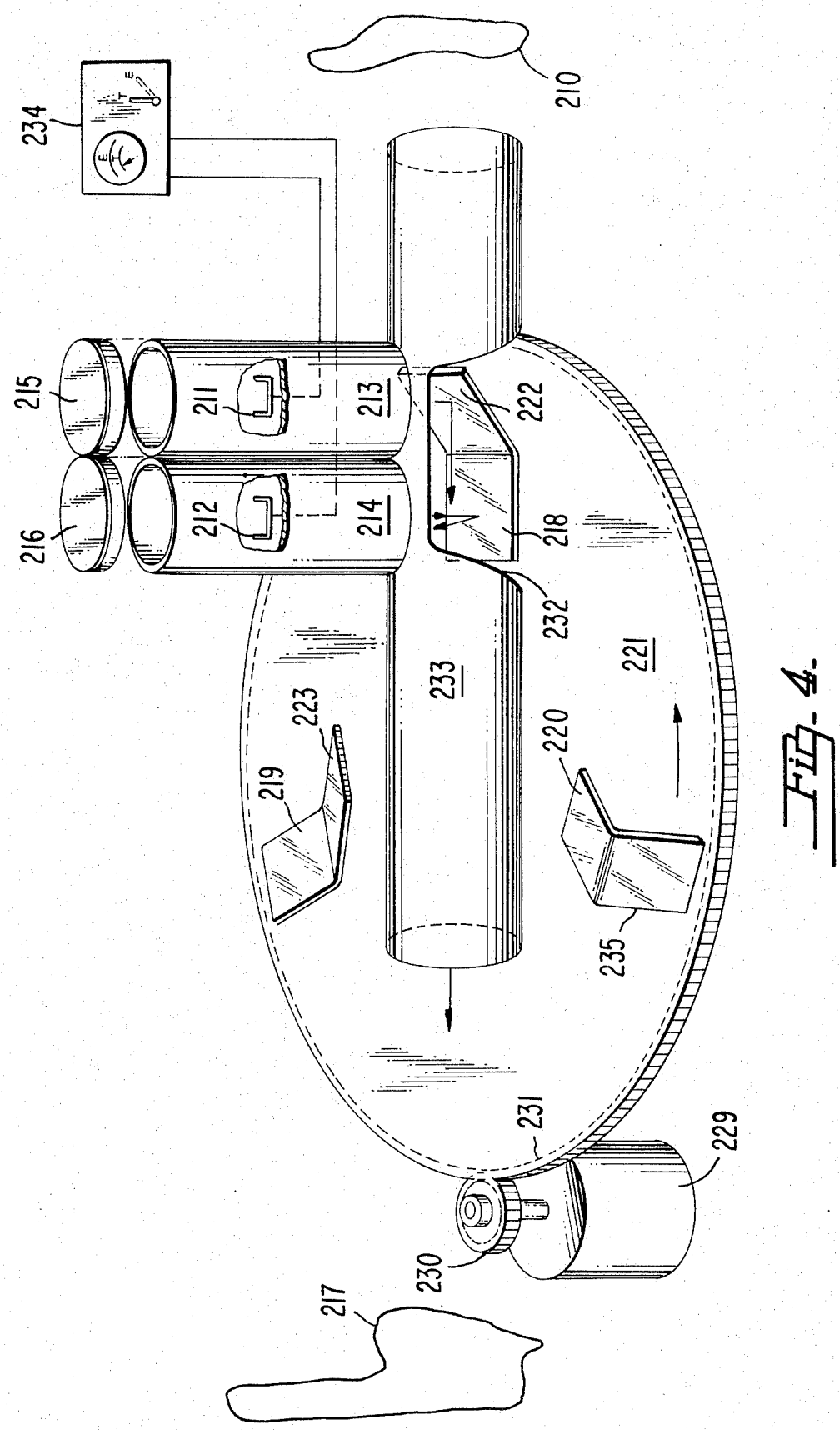
FIG. 4 is a drawing of a third measuring position of an improved temperature measuring radiometer.

Referring to FIG. 4, there is shown an illustration of a third radiometer meauring postion. Disc 221 is rotated by motor 229 until the pair of isothermal reflective surface sections 218 and 222 pass through aperture 232 and are positioned inside third optical channel 233. Reflective surface section 218 is mounted on the surface of disc 221 orthogonal to the longitudinal axis of second optical channel 214. Reflective surface section 218 is positioned to reflect back to second sensor 212 all thermal energy radiated by second sensor 212. The resulting second sensor generated electrical signal, if any, is the second sensor reference signal level. The second sensor reference signal is coupled to apparatus 234 where it is recorded and stored.

Reflecting surface section 222 is mounted on the surface of disc 221 at a predetermined angle. The mounting angle of reflective surface section 222 permits thermal radiation from the external source 217 of the irradiation factor, H, to be detected by only first thermal sensor 211. As an example, reflective surface section 222 is mounted at an angle of 45° with respect to the surface of disc 221. The net thermal radiant energy exchange between external source 217 and the first sensor 211 is converted by first sensor 211 into a proportional electrical signal which is coupled to apparatus 234. The relative magnitude and polarity of this first sensor generated electrical signal is recorded and stored by apparatus 234 as voltage signal $V'_2$. The relative voltage signal $V'_2$ is used by apparatus 234 in the computation of the true target body temperature, $T_1$, and emissivity, $E_1$, according to equations (1) and (2).

A preferred embodiment of the invention has been shown and described. Various other embodiments and modifications thereof will be apparent to those skilled in the art. For example, the sun is not a source which radiates a target body uniformly over a solid angle of $2\pi$ steradians. Therefore, optical rejection filters can be included in some or all of the optical channels to exclude the sun's radiation.

What is claimed is:

1. Apparatus for remotely measuring the temperature and emissivity of a radiant object being irradiated by an external source independent of the radiant surface property of said object comprising:
   a first sensor operating at a first temperature and generating electrical signals proportional to first sensor detected radiation;
   a second sensor operating at a second temperature and generating electrical signals proportional to second sensor detected radiation;
   means for selectively directing radiation from said external source and said radiant body to said first and second sensors causing said first and second sensors respectively to generate electrical signals proportional to radiation from said source and said body; and
   means for stimulating said first and second sensors into generating a reference electrical signal proportional to the radiation respectively from said first and second sensors;
   whereby temperature and emissivity of said radiant object is determinable.

2. Apparatus according to claim 1, wherein said selective radiation directing means comprise first and second optical channels having coterminous ends terminated by first and second catoptric lenses; and
   means for selectively terminating the other end of said first optical channel in first, second and third reflective surface sections, and said second optical channel in fourth, fifth and sixth reflective surface sections, said first section being positioned to reflect net thermal radiation from said source to said first sensor located within said first channel within the focal plane of said first catoptric lens, said second section being positioned to reflect net thermal radiation from said body to said first sensor, said third section being positioned to reflect thermal radiation from said first sensor back to said first sensor, said fourth section being positioned to reflect net thermal radiation from said source to said second sensor located within said second channel within the focal plane of said second catoptric lens, said fifth section being positioned to reflect net thermal radiation from said body to said second sensor and said sixth section being positioned to reflect thermal radiation from said second sensor back to said second sensor.

3. Apparatus according to claim 2, wherein said selective terminating means is a rotatable disc having first, second and third pairs of reflective surface sections mounted thereon, said first pair being a combination of said third section and said fifth section, said second pair being a combination of said sixth section and said first section, and said third pair being a combination of said second section and said fourth section.

4. Apparatus according to claim 1, wherein said body temperature is determined by the equation:

$$\sigma T_1^4 = \sigma T_2^4 [(V'_3 - (T_3/T_2)^4 V'_2/V'_3 - V'_2) + (V_3 - V'_3) - (T_3/T_2)^4 (V_2 - V'_2)/V_3 - V_2)] \quad (1)$$

where $\sigma$ is the Stefan-Boltzman constant, $T_2$ is said first sensor operating temperature, $T_3$ is said second sensor operating temperature, $V'_2$ is the relative electrical signal generated by said first sensor in response to said external source radiation, $V_2$ is the relative electrical signal generated by said first sensor in response to radiation from said radiant body, $V'_3$ is the relative electrical signal generated by said second sensor in response to radiation from said external source, $V_3$ is the relative electrical signal generated by said second sensor in response to radiation from said body.

5. Apparatus according to claim 1, wherein said emissivity, $E_1$, of said body is determined by the equation:

$$E_1 = V_2 - V_3/V'_2 - V'_3$$

where $V_2$ is the relative electrical signal generated by said first sensor in response to radiation from said body, $V_3$ is the relative electrical signal generated by said second sensor in response to radiation from said body, $V'_2$ is the relative electrical signal generated by said first sensor in response to radiation from said external source, $V'_3$ is the relative electrical signal generated by said second sensor in response to radiation from said external source.

6. Method for remotely measuring the temperature and emissivity of a radiant object being irradiated by an external source, independent of the radiant surface property of said object comprising:
   generating a reference electrical signal by a first sensor operating at a first temperature and responsive to thermal radiant energy;
   generating a reference electrical signal by a second sensor operating at a second temperature and responsive to thermal radiant energy;
   directing radiation from said external source and said radiant body to said first and second sensors;
   generating to first electrical signal by said first sensor in response to a thermal radiant exchange between said external source and said first sensor;
   generating a second electrical signal by said first sensor in response to a thermal radiant exchange between said radiant object and said second sensor;
   generating a third electrical signal by said second sensor in response to a thermal radiant exchange between said external source and said second sensor;
   generating a fourth electrical signal by said second sensor in response to a thermal radiant exchange between said radiant object and said second sensor; and
   computing said temperature and emissivity from the magnitude and polarity of said first, second, third and fourth electrical signals relative to said reference signal.

* * * * *

UNITED STATES PATENT OFFICE
CERTIFICATE OF CORRECTION

Patent No. 3,770,973   Dated November 6, 1973

Inventor(s) William Edward Martin

It is certified that error appears in the above-identified patent and that said Letters Patent are hereby corrected as shown below:

Column 3, line 36, change "$(I_3/T_2)^4$ to read -- $(T_3/T_2)^4$.

Signed and sealed this 23rd day of April 1974.

(SEAL)
Attest:

EDWARD M. FLETCHER, JR.
Attesting Officer

C. MARSHALL DANN
Commissioner of Patents